(12) United States Patent
Shinotsuka et al.

(10) Patent No.: US 6,958,775 B1
(45) Date of Patent: Oct. 25, 2005

(54) PHOTO-SENSOR CIRCUIT WITH SHUTTER FUNCTION AND OPERATING METHOD

(75) Inventors: Sukeyuki Shinotsuka, Sayama (JP); Katsuhiko Takebe, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1022 days.

(21) Appl. No.: 09/710,196

(22) Filed: Nov. 10, 2000

(30) Foreign Application Priority Data

Nov. 12, 1999 (JP) ................................. 11-359622

(51) Int. Cl.$^7$ .............................................. H04N 3/14
(52) U.S. Cl. ...................... 348/302; 348/297; 348/248; 348/300
(58) Field of Search ................................. 348/302, 297, 348/248, 300, 301, 303, 308, 311, 312; 250/208.1, 250/214 A; 257/225

(56) References Cited

U.S. PATENT DOCUMENTS

| | | | |
|---|---|---|---|
| 6,046,444 A * | 4/2000 | Afghahi ...................... | 348/308 |
| 6,191,408 B1 * | 2/2001 | Shinotsuka et al. ...... | 250/208.1 |
| 6,317,154 B2 * | 11/2001 | Beiley ........................ | 348/308 |

* cited by examiner

Primary Examiner—Tuan Ho
Assistant Examiner—Gevell Sellby
(74) Attorney, Agent, or Firm—Fulbright & Jaworski L.L.P.

(57) ABSTRACT

A photo-sensor circuit according to an embodiment of the present invention comprises a photo-detecting element (PD) for detecting a light signal and converting the same signal into an electric signal, a first MOS transistor (QT) for charging and discharging parasitic capacitance (C1), a capacitor (C2) for accumulating a terminal voltage of the photo-detecting element as a pixel signal, a second MOS transistor (Q2) for transferring a parasitic capacitance charge from the photo-detecting element to the capacitor (C2), a third MOS transistor (Q3) for amplifying the terminal voltage of the capacitor and a fourth MOS transistor (Q4) for selectively outputting an amplified pixel signal. In the above structure, the first MOS transistor and the second MOS transistor are turned ON for a certain period of time before accumulation of a pixel signal to equalize terminal voltages of the photo-detecting element and the capacitor by charging and discharging the parasitic capacitance of the photo-detecting element and the capacitor, the second MOS transistor is turned OFF and the capacitor is open after a certain period of time of accumulation of the pixel signal and then the fourth MOS transistor is switched ON. This photo-sensor circuit offers an advantageous feature of producing a pixel signal having high reproducibility.

6 Claims, 7 Drawing Sheets capacitor C1

↓ capacitor C2 capacitor C1

↓ capacitor C2 capacitor C1

↓ capacitor C2

PHOTO-SENSOR CIRCUIT WITH SHUTTER FUNCTION AND OPERATING METHOD

BACKGROUND OF THE INVENTION

The present invention relates to a photo-sensor circuit for detecting a light signal and converting the detected light signal into an electric signal and a method of operating the circuit, and, more specifically, to a photo-sensor circuit having a shutter function.

FIG. 1 shows a photo-sensor circuit having a shutter function (sample-and-hold function), which can be used as one of pixel detecting elements composing an image sensor. This photo-sensor circuit comprises a photodiode PD for detecting a light signal and converting it into an electric signal, a MOS transistor Q1 for charging/discharging a capacitor C1 being a parasitic capacitance of the photodiode, a capacitor C2 for accumulating a terminal voltage of the photodiode PD as a pixel signal, a MOS transistor Q2 for transferring an electric charge from the capacitor C1 to the capacitor C2, a MOS transistor Q3 for amplifying a terminal voltage of the capacitor C2 and a MOS transistor Q4 for selectively outputting an amplified pixel signal.

The above conventional photo-sensor circuit works with signals generated by respective parts at respective timings as shown in FIG. 9 when operated by a conventional method.

Namely, a transistor Q1 is turned ON when a driving voltage V1 increases to a high level at timing t1–t2 to give an electric charge to the capacitor C1 being a parasitic capacitance of the photodiode PD. Once the photodiode PD is illuminated, a sensor current flows causing the capacitor C1 to reduce the electric charge by an amount proportional to the flowing current.

The transistor Q2 is then turned ON when a driving voltage V3 increases to a high level at timing t3–t4 to transfer an electric charge from the capacitor C1 to the capacitor C2. When the transistor Q4 is then turned ON by an increase in driving voltage V4 to a high level at timing t4–t5, a current from a power supply V5 is supplied and limited by the transistor Q3. Consequently, a pixel signal Vout is output through a resistance R.

In this photo-sensor circuit, the transistor Q2 becomes turned-off at timing t4 and the capacitor C2 maintains a constant electric charge until the transistor Q2 is turned OFF to transfer the electric charge from the capacitor C1 to the capacitor C2. In other words, during the turned-off period of the transistor Q2 (a holding time of the capacitor C2), the same output can be obtained as a pixel signal independent of a change in the terminal voltage Vc1 of the capacitor C1.

Owing to the above-described structure, the photo-sensor circuit can act as a shutter for a single pixel. The open time of this shutter can be controlled.

FIG. 10 shows another structure of the photo-sensor circuit having a shutter function, wherein a MOS transistor Q5 is further provided for charging and discharging the capacitor C2.

The operation of the thus constructed photo-sensor circuit differs from that of the fore-mentioned photo-sensor circuit by the fact that its pixel signal is initialized by discharging the capacitor C2 when the transistor Q5 of the circuit is turned ON by an increase in driving voltage V6 at timing t6–t7 as shown in FIG. 11.

The photo-sensor circuit shown in FIG. 1 can transfer a terminal voltage Vc1 of the capacitor C1 to a capacitor C2 by the action of the transistor Q2 and can retain the electric charge on the capacitor C2 until the transistor Q2 is turned ON again. Consequently, in case there is a difference between the terminal voltages Vc1 and Vc2 of the capacitors C1 and C2, the terminal voltage Vc1 of the capacitor C1 is not correctly reflected on that of the capacitor C2 until the transistor Q2 is turned ON again. This results in decreasing the reproducibility of the signal.

FIG. 12 shows a model of accumulation of electric charge in the capacitors C1 and C2 respectively while the photo-sensor circuit of FIG. 1 is operated by a conventional method and is continuously sensing light signals.

In the photo-sensor circuit constructed as shown in FIG. 10, the capacitor C2 can be charged and discharged by the transistor Q5 and hence the terminal voltage Vc1 of the capacitor C1 can be well-reproducibly transferred to the capacitor C2. However, there arises such a problem that a charge of the capacitor C2 becomes smaller than a charge of the capacitor C1.

FIG. 13 shows a model of accumulation of electric charge in the capacitors C1 and C2 respectively while the photo-sensor circuit of FIG. 10 is operated by a conventional method.

SUMMARY OF THE INVENTION

Accordingly, it is an object of the present invention to provide a method of operation and a photo-sensor circuit capable of initializing a capacitor by turning ON a first transistor before turning ON a second transistor for charging and discharging another capacitor that is a parasitic capacitance of a photodiode PD in order to prevent the first-mentioned capacitor from reproducing an incorrect voltage.

Another object of the present invention is to provide a photo-sensor circuit wherein a terminal voltage of a parasitic capacitor is always applied to a second capacitor by turning ON a sample-and-hold transistor during the open-state period of a shutter in order to prevent the second capacitor from dropping its voltage.

A further object of the present invention is to provide a photo-sensor circuit that can generate a pixel signal in a wide dynamic range with high reproducibility, which is achieved by using an initial setting means for executing the logarithmic operation by changing a power supply voltage in addition to a shutter function.

DESCRIPTION OF THE PREFERRED EMBODIMENTS

Figure 1:
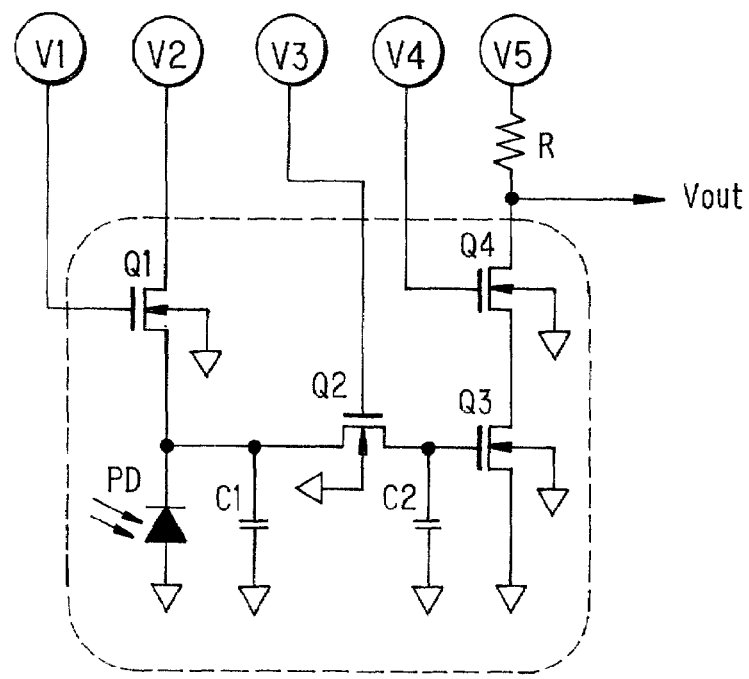
FIG. 1 is a circuit diagram of a photo-sensor circuit according to an embodiment of the present invention.

Referring to FIG. 1, a photo-sensor circuit according to an embodiment of the present invention comprises a photodiode PD being a light-detecting element for sensing light and converting it into an electric signal, a MOS transistor Q1 for charging and discharging a capacitor C1 being a parasitic capacitance of the photodiode PD, a capacitor C2 for accumulating therein a terminal voltage of the photodiode PD as a pixel signal, a MOS transistor Q2 for transferring an electric charge of the capacitor C1 to a capacitor C2, a MOS transistor Q3 for amplifying a terminal voltage of the capacitor C2 and a MOS transistor Q4 for selectively outputting the amplified pixel signal.

In the above photo-sensor circuit of FIG. 1 according to the present invention, an electric signal corresponding to a light signal is obtained by applying control signals for driving respective components of the circuit in a new and inventive method.

Figure 2:
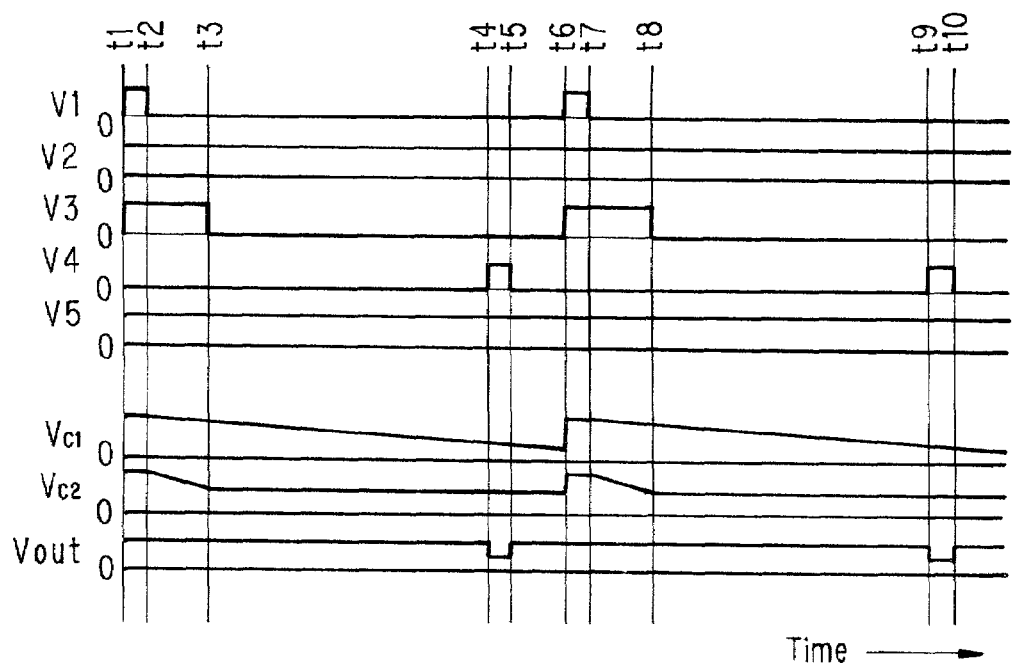
FIG. 2 is a time chart of signals of respective portions of the photo-sensor circuit of FIG. 1.

Namely, as shown in FIG. 2, the transistor Q1 is turned ON by increasing a driving voltage V1 to a high level at timing t1–t2 to give an electric charge to the capacitor C1. When light falls on the photodiode PD, current flows in the sensor circuit and an electric charge proportional to the current flowing in the sensor circuit is removed from the capacitor C1 at timing t2–t3.

During timing t1 to t3 (with the shutter being open) the transistor Q2 is in the turned ON state by a high level of driving voltage V3 and the terminal voltages Vc1 and Vc2 of the capacitors C1 and C2 are equal to each other.

When the transistor Q2 is turned off at timing t3, the terminal voltage Vc2 of the capacitor is held at the same level.

When the transistor Q4 is then turned ON by a high level of driving voltage V4 at timing t4–t5, a current restricted by the transistor Q3 is supplied from the power supply V5 and hence a pixel signal is output as an output voltage Vout through a resistance R.

In the above photo-sensor circuit structure, an electric charge of the capacitor C2 is retained when the transistor Q2 is turned off at timing t3 and thereafter. The electric charge of the capacitor C2 is maintained at a constant value until the transistor Q2 is turned on to begin transferring the electric charge from the capacitor C1 to the capacitor C2. Namely, while the transistor Q2 is off (i.e., for the holding period of the capacitor C2), the same pixel signal can be obtained irrespective of a change in the terminal voltage Vc1 of the capacitor C1.

Therefore, the photo-sensor circuit having 4 transistors as shown in FIG. 1 can obtain a pixel signal Vout having high reproducibility when it is operated according to timing chart shown in FIG. 2.

Figure 3:
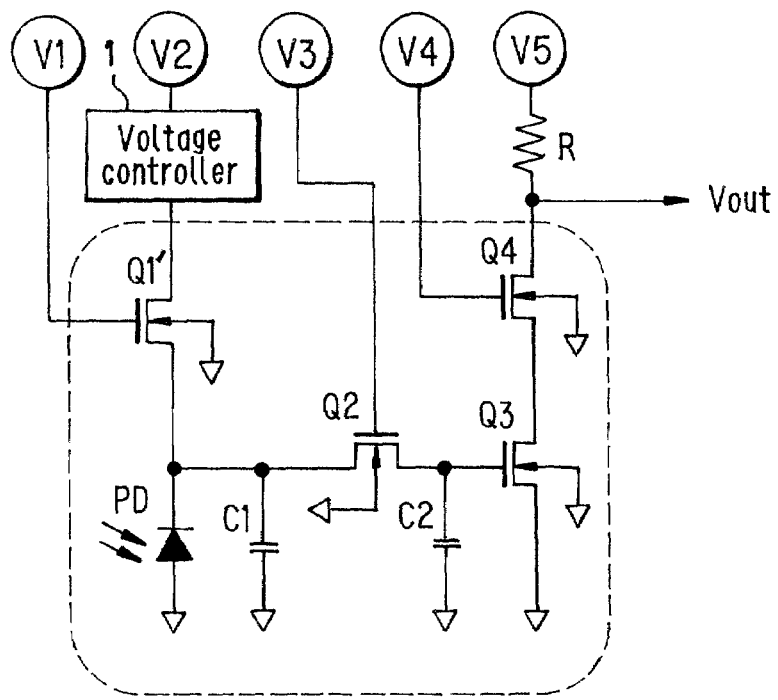
FIG. 3 is a circuit diagram of a photo-sensor circuit according to another embodiment of the present invention.

Referring to FIG. 3, a photo-sensor circuit according to another embodiment of the present invention will be described below.

This embodiment uses a MOS transistor Q1' in particular for converting a sensor current of a photodiode PD into a detection voltage that has a logarithmic characteristic in a weak inversed state and includes a voltage controller 1 (an initial setting means) that can set a drain-side source voltage V2 of the transistor Q1' to a lower voltage value (low level) than the normal voltage value (high level) for a specified period of time and remove an electric charge accumulated in a capacitor C1 that is a parasitic capacitance of the photodiode PD connected to a source side of the transistor.

The operation of the above photo-sensor circuit will be described below with reference to the time chart of FIG. 4.

A supply voltage V1 is set to a detection voltage value into which a current flowing in the transistor Q1 is converted. The voltage V1 possesses a logarithmic characteristic in the weak inversed state with the supply voltage V2 of the high level.

In this state, once a driving voltage V2 is decreased to the low level at timing t1–t2, a drain-source voltage of the transistor Q1' rises and causes the transistor Q1' to be turned ON to remove the electric charge from a capacitor C1 that is a parasitic capacitance of the photodiode PD.

Next, the driving voltage V2 is changed to the high level at timing t2 and the capacitor C1 is charged with a voltage at which a sensor current flowing through the photodiode PD is balanced with a current supplied from the transistor Q1'.

Since the current flowing in the transistor Q1' has been converted into the voltage having the logarithmic characteristic in its weak inversed state, the terminal voltage Vc1 of the capacitor C1 represents an amount of light incident to the photodiode PD, which has been logarithmically transformed and outputted.

During the above period t1–t3 (with the shutter being open), a transistor Q2 is also in the ON-state by an increased level of the voltage V3 and hence the terminal voltage Vc1 of the capacitor C1 is equal to the terminal voltage Vc2 of the capacitor C1.

When the transistor Q2 is turned OFF at timing t3, the terminal voltage Vc2 of the capacitor C2 is held in the steady state.

When a transistor Q4 is then turned ON by an increased voltage V4 at timing t4–t5, a current from a power supply V5 is supplied that is restricted by the transistor Q3 and a pixel signal through a resistance R is output as an output voltage Vout.

In the above photo-sensor circuit structure, an electric charge of the capacitor C2 is held when the transistor Q2 is turned OFF at timing t3 and thereafter. The electric charge of the capacitor C2 is maintained at a constant value until the transistor Q2 is turned ON to begin transferring the electric charge from the capacitor C1 to the capacitor C2. Namely, with the transistor Q2 being in the OFF-state (during the holding time of the capacitor C2), the same pixel signal is output irrespective of a change in a terminal voltage Vc1 of the capacitor C1.

Figure 4:
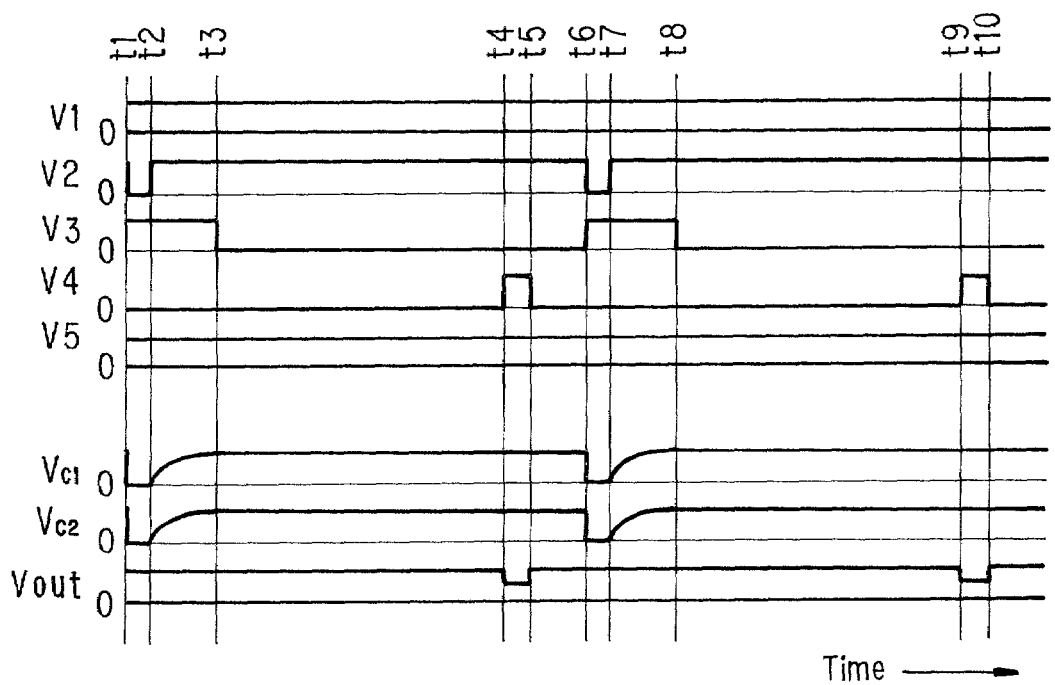
FIG. 4 is a time chart of signals of respective portions of the photo-sensor circuit of FIG. 3.

Therefore, the photo-sensor circuit shown in FIG. 3 can function as a shutter that is free from the effect of afterglow and has a wide dynamic range of its logarithmic output during the operation according a timing chart shown in FIG. 4.

An image sensor can be constructed of photo-sensor circuits according to any of the embodiments of the present invention, which circuits are arranged in one- or two-dimensional plane to form respective pixel-detecting components.

Figure 5:
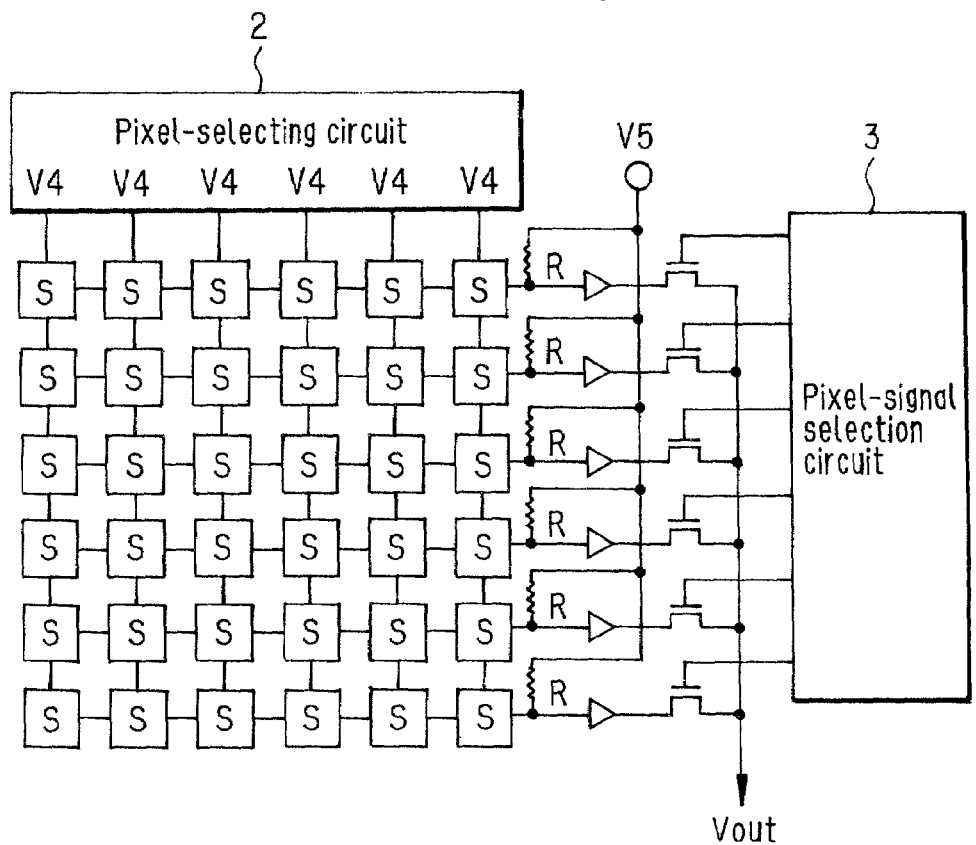
FIG. 5 is an exemplary block diagram of an image sensor constructed of a two-dimensional matrix of photo-sensor circuits according to the present invention, wherein each photo-sensor circuit serves for a single pixel.

FIG. 5 is an exemplary image sensor structure in which the photo-sensor circuits of FIG. 1 are arranged to form a two-dimensional matrix of the light-sensors each representing a single pixel S therein. In FIG. 5, numeral 2 designates a pixel-selecting circuit common to all pixels S and numeral 3 designates a pixel-signal selecting circuit for subsequently outputting respective pixel signals.

Figure 6:
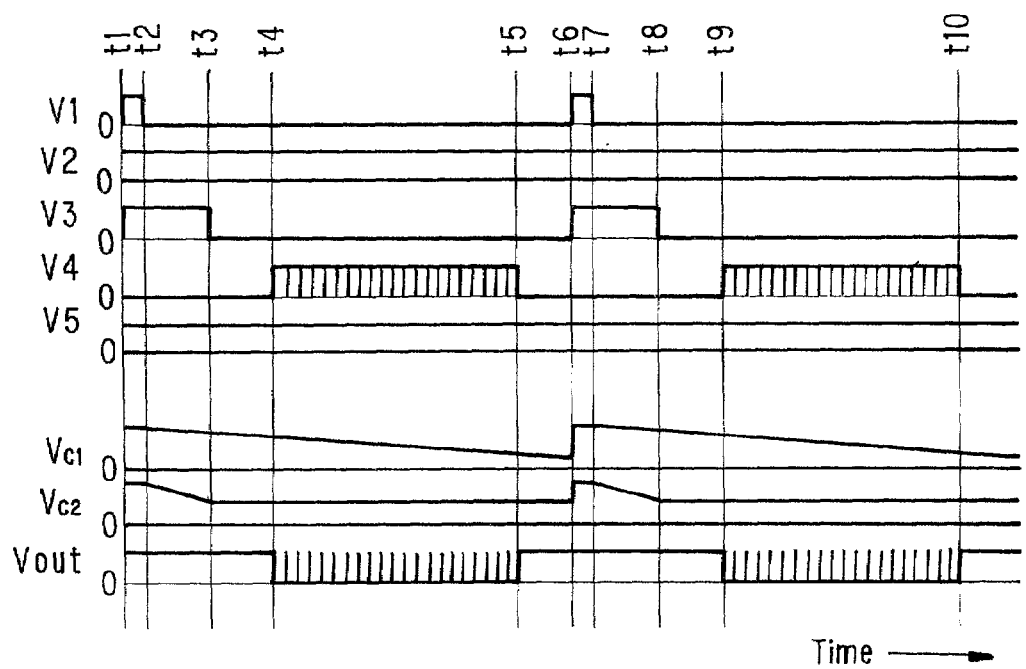
FIG. 6 is a time chart of signals generated by respective portions of the image sensor of FIG. 5.

FIG. 6 is a time chart for respective signals of the above image sensor.

In this instance, respective pixels S arranged in a matrix are scanned to read at timing t4–t5 in particular. In each photo-sensor circuit representing one pixel S, when the transistor Q4 is turned ON, a current from the power supply V5, restricted by the transistor Q3, is supplied to respective pixels and hence respective pixel signals Vout are output through a resistance connected to a row of pixels S in the matrix.

Therefore, the above image-sensor of the four-transistor structure of FIG. 1 can obtain pixel signals each having high reproducibility.

Figure 7:
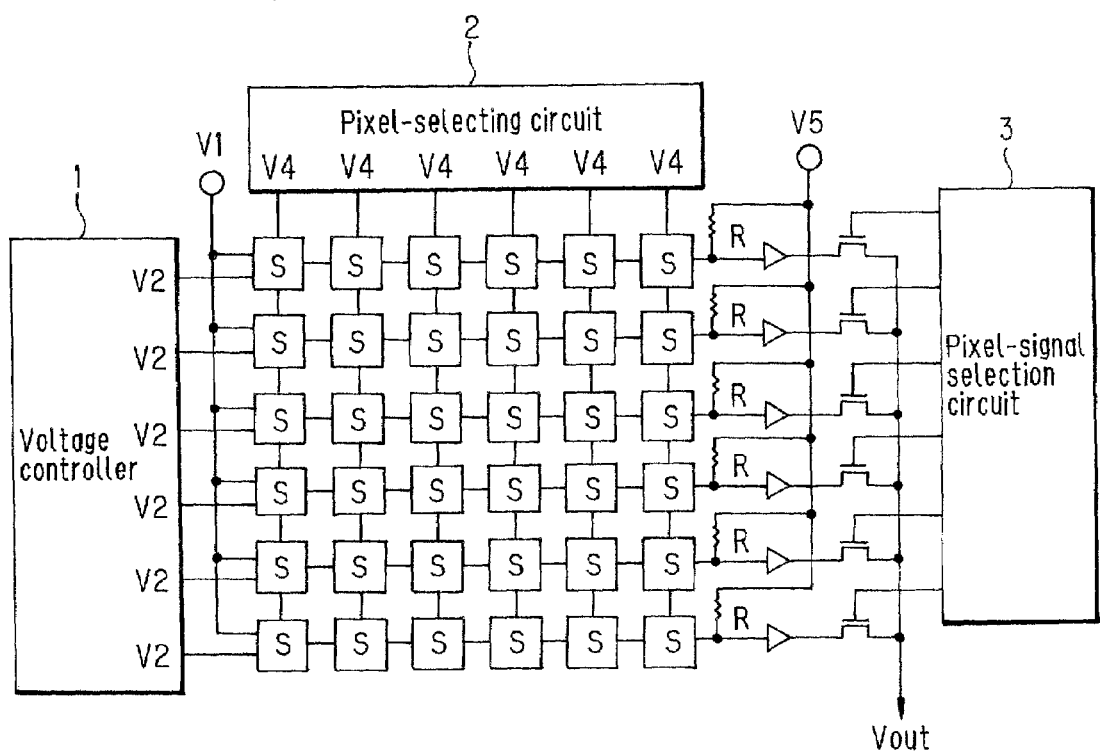
FIG. 7 is another exemplary block diagram of an image sensor constructed of a two-dimensional matrix of photo-sensor circuits according to the present invention, wherein each photo-sensor circuit serves for a single pixel.

FIG. 7 is an exemplary image sensor structure in which the photo-sensor circuits of FIG. 3 are arranged to form a two-dimensional matrix of the light-sensors each representing a single pixel S therein. In FIG. 7, numeral 1 designates a voltage controller provided common to all pixels S, numeral 2 designates a pixel-selecting circuit common to all pixels S and numeral 3 designates a pixel-signal selecting circuit for subsequently outputting respective pixel signals.

Figure 8:
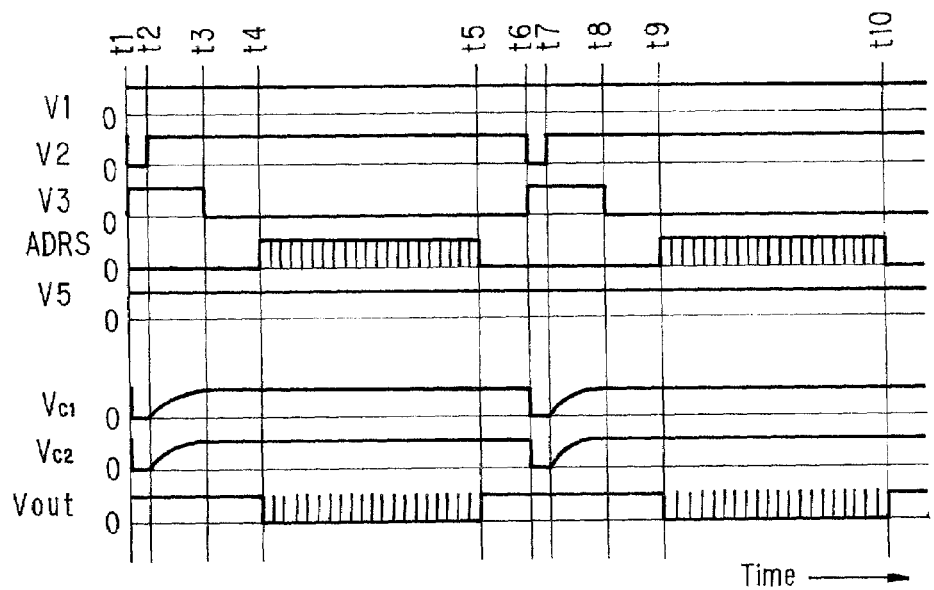
FIG. 8 is a time chart of signals generated by respective portions of the image sensor of FIG. 7.
Figure 9:
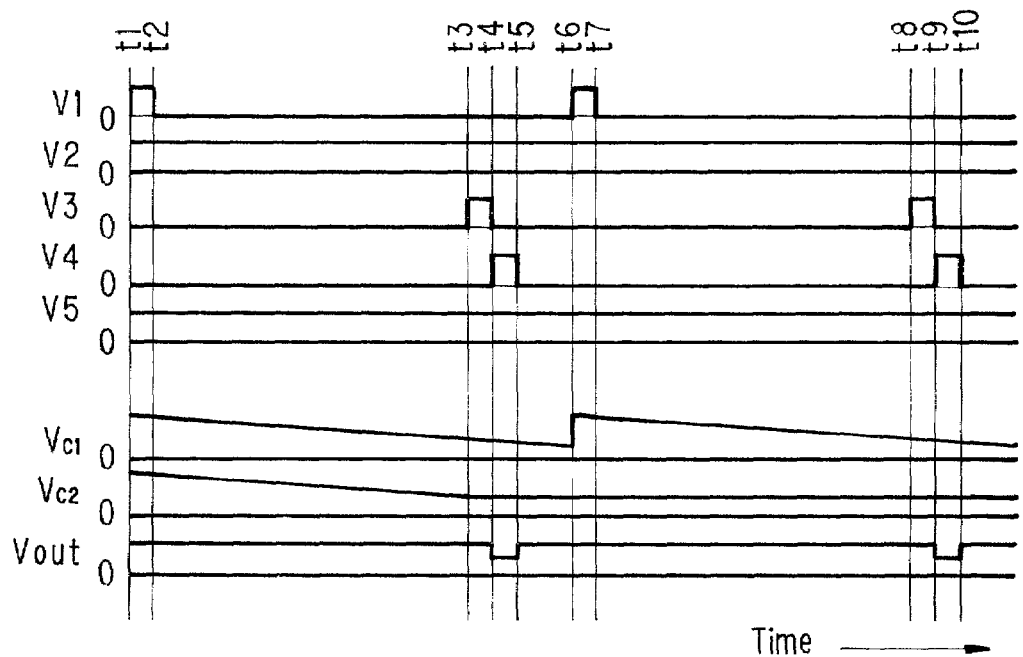
FIG. 9 is a time chart of signals generated by respective portions of the photo-sensor circuit shown in FIG. 1 when the circuit is operated according to a conventional method.
Figure 10:
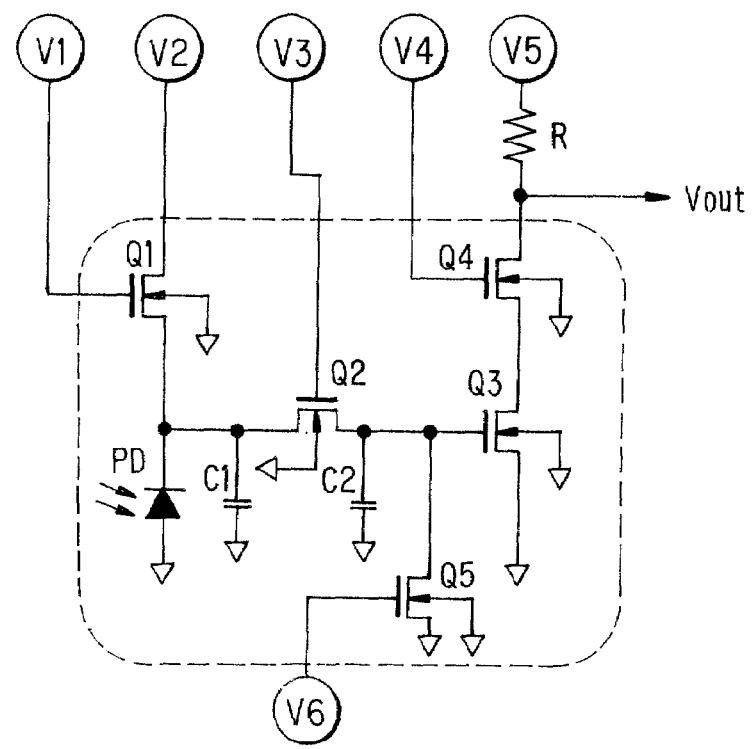
FIG. 10 is a circuit diagram of a conventional photo-sensor circuit having a shutter function.
Figure 11:
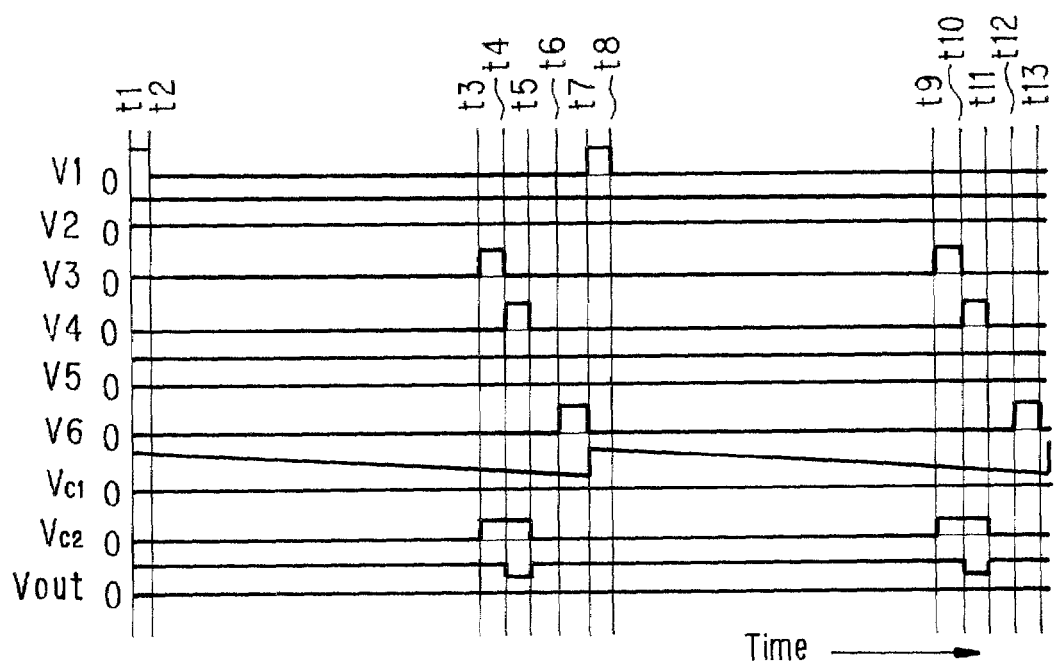
FIG. 11 is a time chart of signals generated by respective portions of the conventional photo-sensor circuit of FIG. 10.
Figure 12:
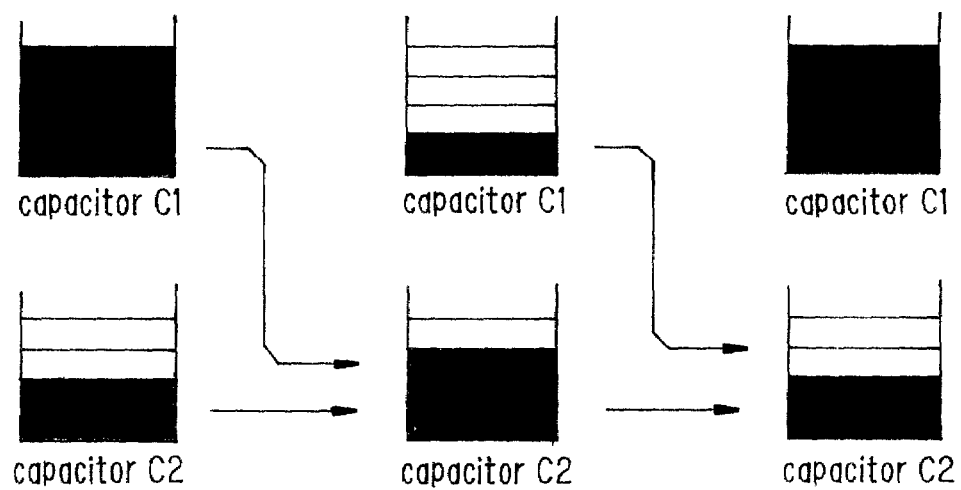
FIG. 12 shows a model of accumulation of electric charge in capacitors C1 and C2 respectively when the photo-sensor circuit of FIG. 1 is operated by a conventional method.
Figure 13:
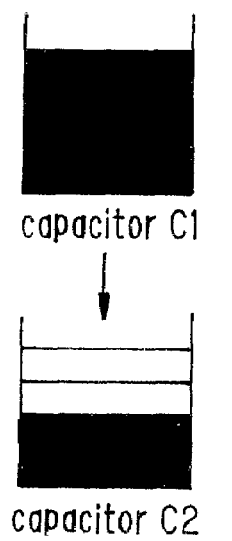
FIG. 13 shows a model of accumulation of electric charge in capacitors C1 and C2 respectively when the photo-sensor circuit of FIG. 10 is operated by a conventional method.
Figure 13:
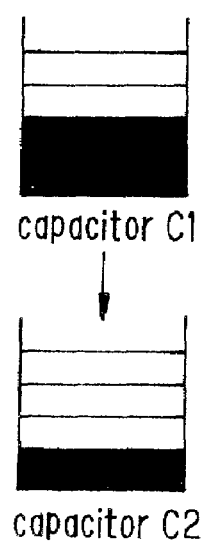
Figure 13:
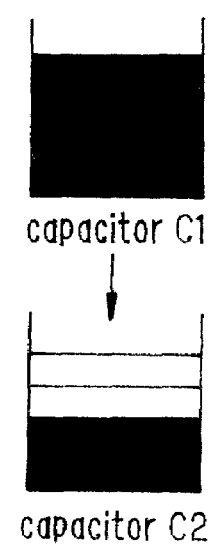

FIG. 8 is a time chart for respective signals of the above image sensor.

In this instance, respective pixels S arranged in a matrix are scanned to read at timing t4–t5 in particular. In the time charts shown in FIGS. 6 and 8, it is possible to set an accumulating period (i.e., a shutter-opening period with a high level supply voltage V3) elongated to timing t4.

A photo-sensor circuit according to an embodiment of the present invention comprises a photo-detecting element (PD) for detecting a light signal and converting the same signal into an electric signal, a first MOS transistor (Q1) for charging and discharging parasitic capacitance (C1), a capacitor (C2) for accumulating a terminal voltage of the photo-detecting element as a pixel signal, a second MOS transistor (Q2) for transferring a parasitic capacitance electric charge from the photo-detecting element to the capacitor (C2) a third MOS transistor (Q3) for amplifying the terminal voltage of the capacitor and a fourth MOS transistor (Q4) for selectively outputting an amplified pixel signal. In the photo-sensor circuit structure, the first MOS transistor and the second MOS transistor are turned ON for a certain period of time before accumulation of a pixel signal to charge and discharge the parasitic capacitance of the photo-detecting element and the capacitor until terminal voltages of the photo-detecting element and the capacitor become the same, the second MOS transistor is turned OFF and the capacitor is open after a certain period of time of accumulation of the pixel signal and then the fourth MOS transistor is switched ON. The photo-sensor circuit offers an advantageous feature of producing a pixel signal having high reproducibility.

A photo-sensor circuit according to another embodiment of the present invention comprises a photo-detecting element (PD) for sensing a light-signal and converting said signal into an electric signal, a first MOS transistor (Q1') for converting a current of the photo-detecting element into a voltage having a logarithmic characteristic in a weakly inverted state, an initial setting means (1) for controlling an electric charge accumulated in the parasitic capacitance (C1) of the photo-detecting element connected to a source by setting a drain voltage of the first MOS transistor to a low voltage for a certain period of time, a capacitor (C2) for accumulating a terminal voltage of the photo-detecting element as a pixel signal, a second MOS transistor (Q2) for transferring a parasitic capacitance charge from the photo-detecting element to the capacitor (C2), a third MOS transistor (Q3) for amplifying the terminal voltage of the capacitor and a fourth MOS transistor (Q4) for selectively outputting an amplified pixel signal. In this photo-sensor circuit structure, the second MOS transistor is switched ON and at the same time a voltage of the initial setting means is set to a low level to bring a parasitic capacitance of the photo-detecting element and a terminal voltage of the capacitor into a low level state before accumulation of a pixel signal, then after a certain period of time, the voltage of the initial setting means is switched to a high level state to start accumulation of a pixel signal, then after a certain period of time, the second MOS transistor is turned OFF to cause the capacitor to be open, and finally the fourth MOS transistor is switched ON. The above photo-sensor circuit offers such an advantage that it can form a shutter that is free from the effect of afterglow and has a wide dynamic range of a logarithmic output, assuring obtaining a pixel signal having high reproducibility.

What is claimed is:

1. A photo-sensor circuit comprising a photo-detecting element, a first MOS transistor for charging and discharging a parasitic capacitance of the photo-detecting element, a capacitor for accumulating a terminal voltage of the photo-detecting element as a pixel signal, a second MOS transistor for transferring a parasitic capacitance electric charge from the photo-detecting element to the capacitor, a third MOS transistor for amplifying the terminal voltage of the capacitor, and a fourth MOS transistor for selectively outputting an amplified pixel signal, characterized in that the first MOS transistor and the second MOS transistor are turned ON for a certain period of time before accumulation of a pixel signal to equalize terminal voltages of the photo-detecting element and the capacitor by charging/discharging the parasitic capacitance of the photo-detecting element and the capacitor, the second MOS transistor is turned OFF and the capacitor is open after a certain period of time of accumulation of the pixel signal and then the fourth MOS transistor is switched ON.

2. A photo-sensor circuit comprising a photo-detecting element for sensing a light-signal and converting said signal into an electric signal, a first MOS transistor for converting a current of the photo-detecting element into a voltage having a logarithmic characteristic in a weakly inverted state, an initial setting means for controlling an electric charge accumulated in a parasitic capacitance of the photo-detecting element connected to a source by setting a drain voltage of the first MOS transistor to a low voltage for a certain period of time, a capacitor for accumulating a terminal voltage of the photo-detecting element as a pixel signal, a second MOS transistor for transferring a parasitic capacitance electric charge from the photo-detecting element to the capacitor, a third MOS transistor for amplifying the terminal voltage of the capacitor, and a fourth MOS transistor for selectively outputting an amplified pixel signal, characterized in that the second MOS transistor is switched ON and at the same time a voltage of the initial setting means is set to a low level to bring a parasitic capacitance of the photo-detecting element and a terminal voltage of the capacitor into a low level state before accumulation of a pixel signal, then after a certain period of time, the voltage of the initial setting means is switched to a high level state to start accumulation of a pixel signal, then after a certain period of time, the second MOS transistor is turned OFF to cause the capacitor to be open, and then the fourth MOS transistor is switched ON.

3. A photo-sensor circuit as defined in any of claims 1 and 2, characterized in that it is a single-pixel detecting component of an image sensor.

4. A photo-sensor circuit comprising a photo-detecting element for sensing a light-signal and converting said signal into an electric signal, a first MOS transistor connected to said photo-detecting element, a parasitic capacitance means connected to said first MOS transistor and said photo-detecting element, a second MOS transistor connected to said parasitic capacitance means and said photo-detecting element, a third MOS transistor, a capacitor connected to between said second and third MOS transistors, and a fourth MOS transistor for selectively outputting an amplified pixel signal, characterized in that an initial setting means is connected to said parasitic capacitance means through said first said first MOS transistor for controlling an electric charge accumulated in said parasitic capacitance, said second MOS transistor is switched ON and at the same time a voltage of said initial setting means is set to a low level to bring a parasitic capacitance of the photo-detecting element and a terminal voltage of the capacitor into a low level state before accumulation of a pixel signal, then after a certain period of time, a voltage of the initial setting means is switched to a high level state to start accumulation of a pixel signal, then after a certain period of time, the second MOS transistor is turned OFF to cause the capacitor to be open and then the fourth MOS transistor is switched ON.

5. A method of operating a photo-sensor circuit that is comprised of a photo-detecting element, a first MOS transistor for charging and discharging a parasitic capacitance of the photo-detecting element, a capacitor for accumulating a terminal voltage of the photo-detecting element as a pixel signal, a second MOS transistor for transferring a parasitic capacitance electric charge from the photo-detecting element to the capacitor, a third MOS transistor for amplifying the terminal voltage of the capacitor, and a fourth MOS transistor for selectively outputting an amplified pixel signal, comprising the steps of;

turning ON the first MOS transistor and the second MOS transistor for a certain period of time before accumulation of a pixel signal to equalize terminal voltages of the photo-detecting element and the capacitor by charging/discharging the parasitic capacitance of the photo-detecting element and the capacitor, turning OFF the second MOS transistor to open the capacitor after a certain period of time of accumulation of the pixel signal, and turning ON the fourth MOS transistor for outputting an amplified pixel signal.

6. A method of operating a photo-sensor circuit that is comprised of a photo-detecting element for sensing a light-signal and converting said signal into an electric signal, a first MOS transistor for converting a current of the photo-detecting element into a voltage having a logarithmic characteristic in a weakly inverted state, an initial setting means for controlling an electric charge accumulated in the parasitic capacitance of the photo-detecting element connected to a source by setting a drain voltage of the first MOS transistor to a low voltage for a certain period of time, a capacitor for accumulating a terminal voltage of the photo-detecting element as a pixel signal, a second MOS transistor for transferring a parasitic capacitance electric charge from the photo-detecting element to the capacitor, a third MOS transistor for amplifying the terminal voltage of the capacitor, and a fourth MOS transistor for selectively outputting an amplified pixel signal, comprising the steps of;

switching ON the second MOS transistor at the same time a voltage of the initial setting means is set to a low level to bring a parasitic capacitance of the photo-detecting element and a terminal voltage of the capacitor into a low level state before accumulation of a pixel signal, then, after a certain period of time, switching the voltage of the initial setting means to a high level state to start accumulation of a pixel signal, then, after a certain period of time, switching OFF the second MOS transistor to cause the capacitor to be open, and switching ON the fourth MOS transistor for outputting an amplified signal.

* * * * *